US012799919B2

(12) United States Patent
Jimenez de Lago et al.

(10) Patent No.: US 12,799,919 B2
(45) Date of Patent: Nov. 17, 2026

(54) FLOW MODIFYING ELEMENT FOR WIND TURBINE BLADE

(71) Applicant: Siemens Gamesa Renewable Energy Innovation & Technology, S.L., Sarriguren (ES)

(72) Inventors: Mario Jimenez de Lago, Madrid (ES); Jairo Escudero Guijarro, Madrid (ES); Morten Rams Quistgaard, Silkeborg (DK)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 0 days.

(21) Appl. No.: 19/136,356

(22) PCT Filed: Nov. 27, 2023

(86) PCT No.: PCT/EP2023/083226
§ 371 (c)(1),
(2) Date: Jun. 6, 2025

(87) PCT Pub. No.: WO2024/153373
PCT Pub. Date: Jul. 25, 2024

(65) Prior Publication Data
US 2026/0194039 A1 Jul. 9, 2026

(30) Foreign Application Priority Data
Jan. 20, 2023 (EP) .................................... 23382045

(51) Int. Cl.
*F03D 1/06* (2006.01)
*F03D 7/02* (2006.01)

(52) U.S. Cl.
CPC ....... *F03D 1/06495* (2023.08); *F03D 1/0633* (2013.01); *F03D 1/0645* (2023.08);
(Continued)

(58) Field of Classification Search
CPC .. F03D 1/06495; F03D 1/0633; F03D 1/0645; F03D 1/0647; F03D 7/0232;
(Continued)

(56) References Cited

U.S. PATENT DOCUMENTS 3,144,220 A * 8/1964 Kittelson ................ B64C 23/00
244/199.1
3,360,218 A * 12/1967 Miller ................. B64C 29/0041
244/12.5
(Continued)

FOREIGN PATENT DOCUMENTS

CN 106536351 B * 12/2019 ............ B64C 27/72
EP 2322793 A1 5/2011
(Continued)

OTHER PUBLICATIONS

PCT International Search Report and Written Opinion of International Searching Authority mailed Feb. 19, 2024 corresponding to PCT International Application No. P CT/E P 2023/083226 filed Nov. 27, 2023.

*Primary Examiner* — Brian Christopher Delrue

(57) ABSTRACT

A flow modifying element for a wind turbine blade is provided. The wind turbine blade (10) comprises a blade body (20) having a leading edge (16), a suction surface (18), a pressure surface (19), and a trailing edge (17). The blade body (20) has a chord length c, wherein the leading edge (16) corresponds to a position in chord direction of 0% c and the trailing edge (17) corresponds to a position in chord direction of 100% c. The flow modifying element (30) is configured to be arranged on the pressure surface (19) of the blade body (20) in a range in chord direction between 40% c and 100% c. The flow modifying element (30) is further configured to form a bulge (33) that bulges outwardly from the pressure surface (19) of the blade body (20).

13 Claims, 7 Drawing Sheets

(52) U.S. Cl.
CPC ......... *F03D 1/0647* (2023.08); *F03D 7/0232* (2013.01); *F05B 2240/231* (2013.01); *F05B 2240/3052* (2020.08); *F05B 2240/31* (2013.01); *F05B 2240/311* (2013.01)

(58) Field of Classification Search
CPC ........ F05B 2240/231; F05B 2240/3052; F05B 2240/31; F05B 2240/311
See application file for complete search history.

(56) References Cited

U.S. PATENT DOCUMENTS

| | | | | |
|---|---|---|---|---|
| 4,692,095 | A * | 9/1987 | Lawson-Tancred | F03D 7/0252 416/169 R |
| 6,142,425 | A * | 11/2000 | Armanios | B64C 23/00 239/562 |
| 7,028,954 | B2 * | 4/2006 | Van Dam | B64C 9/00 244/204 |
| 7,204,674 | B2 | 4/2007 | Wobben | |
| 7,946,803 | B2 | 5/2011 | Wobben | |
| 8,047,233 | B2 * | 11/2011 | Clingman | B64C 23/06 137/809 |
| 8,157,533 | B2 | 4/2012 | Godsk et al. | |
| 9,140,233 | B2 * | 9/2015 | Watts | F03D 1/0633 |
| 9,267,491 | B2 | 2/2016 | Vossler et al. | |
| 10,465,652 | B2 * | 11/2019 | Wetzel | F03D 1/0675 |
| 11,536,245 | B2 * | 12/2022 | Herrig | F03D 1/0675 |
| 11,614,068 | B2 * | 3/2023 | Corten | F03D 1/0675 416/236 R |
| 11,674,497 | B2 * | 6/2023 | Arce | F03D 1/0675 416/223 R |
| 11,761,423 | B2 * | 9/2023 | Blok | F03D 1/0675 416/23 |
| 11,795,910 | B2 * | 10/2023 | Enevoldsen | F03D 7/0296 |
| 2003/0091436 | A1 * | 5/2003 | Stiesdal | F03D 7/0252 416/1 |
| 2007/0003403 | A1 * | 1/2007 | Pedersen | F03D 1/0633 415/4.1 |
| 2008/0029255 | A1 * | 2/2008 | Orlandi | F28D 1/0325 165/166 |
| 2008/0240923 | A1 * | 10/2008 | Bonnet | F03D 1/0675 416/223 R |
| 2009/0074574 | A1 * | 3/2009 | Godsk | F03D 7/022 416/41 |
| 2009/0284016 | A1 * | 11/2009 | Van Dam | F03D 1/0675 416/41 |
| 2009/0285682 | A1 * | 11/2009 | Baker | F03D 7/022 416/1 |
| 2010/0310372 | A1 * | 12/2010 | Narasimalu | F03D 7/0232 416/23 |
| 2011/0116927 | A1 * | 5/2011 | Hancock | F03D 7/0232 416/23 |
| 2011/0223022 | A1 * | 9/2011 | Wang | F03D 7/0256 416/23 |
| 2011/0223033 | A1 * | 9/2011 | Wang | F03D 1/0675 416/235 |
| 2012/0141268 | A1 * | 6/2012 | Pesetsky | F03D 7/0232 416/1 |
| 2012/0141271 | A1 * | 6/2012 | Southwick | F03D 7/0232 416/1 |
| 2013/0136594 | A1 * | 5/2013 | Casazza | F03D 17/00 416/1 |
| 2013/0183159 | A1 * | 7/2013 | Fukami | F03D 1/0641 416/223 R |
| 2013/0224024 | A1 * | 8/2013 | Chang | F03D 1/065 416/147 |
| 2014/0112780 | A1 | 4/2014 | Herrig et al. | |
| 2015/0064003 | A1 * | 3/2015 | Drobietz | F03D 7/042 416/1 |
| 2015/0176563 | A1 | 6/2015 | Grasso | |
| 2015/0204306 | A1 * | 7/2015 | Herr | F03D 7/0232 416/23 |
| 2015/0322917 | A1 * | 11/2015 | Eisenberg | F03D 13/30 29/401.1 |
| 2020/0011290 | A1 * | 1/2020 | Akay | F03D 7/022 |
| 2020/0386205 | A1 * | 12/2020 | Altmikus | F03D 7/0232 |
| 2022/0018332 | A1 * | 1/2022 | Kristensen | F03D 7/022 |
| 2022/0025855 | A1 * | 1/2022 | Enevoldsen | F03D 1/0633 |
| 2022/0025858 | A1 * | 1/2022 | Blok | F03D 7/0232 |
| 2022/0025870 | A1 * | 1/2022 | Egedal | F03D 80/40 |
| 2024/0035438 | A1 * | 2/2024 | Herrig | F03D 1/06495 |
| 2024/0110542 | A1 * | 4/2024 | Nielsen | F03D 1/0675 |
| 2024/0254965 | A1 * | 8/2024 | Buck | F03D 1/06495 |
| 2025/0020103 | A1 * | 1/2025 | Enevoldsen | F03D 7/0232 |

FOREIGN PATENT DOCUMENTS

| | | | | | |
|---|---|---|---|---|---|
| EP | 2716906 | A2 | | 4/2014 | |
| EP | 2774843 | A1 | * | 9/2014 | B64C 27/467 |
| EP | 2784301 | A1 | * | 10/2014 | F03D 1/0641 |
| EP | 3051125 | B1 | * | 8/2019 | F03D 1/0675 |
| EP | 3673171 | B1 | | 5/2022 | |
| EP | 4403766 | A1 | * | 7/2024 | F03D 1/06495 |
| GB | 2157774 | A | * | 10/1985 | F03D 7/0252 |
| GB | 2469854 | A | * | 11/2010 | F03D 7/04 |
| WO | WO-0229247 | A1 | * | 4/2002 | F03D 7/02 |
| WO | WO-2007045940 | A1 | * | 4/2007 | F03D 1/0641 |
| WO | WO-2011000628 | A2 | * | 1/2011 | F03D 7/0232 |
| WO | 2014064195 | A1 | | 5/2014 | |
| WO | WO-2015181552 | A1 | * | 12/2015 | B64C 27/72 |
| WO | 2022136547 | A1 | | 6/2022 | |

* cited by examiner

FLOW MODIFYING ELEMENT FOR WIND TURBINE BLADE

FIELD OF THE INVENTION

The present invention relates to a flow modifying element for a wind turbine blade, in particular for providing a trailing edge for such blade, and further to a wind turbine blade comprising such flow modifying element.

BACKGROUND

The use of wind energy is proliferating. To extract more energy from the wind, larger wind turbines requiring larger blades are being manufactured and installed. A wind turbine blade is mounted to a hub of a wind turbine rotor at its root end and extends to a tip end. Whereas the properties of the root region of the blade are usually governed by structural considerations, the mid span and outboard regions of the blade are generally designed for improved aerodynamic performance. The aerodynamic profiles (also termed "airfoils") in the root region of the blade have therefore often a high relative thickness.

To aid rotor startup and energy production at medium wind speeds, the profiles in the root region of the blade may be provided with a large chord length and large twist. This however makes manufacturing of the blade more cost-intensive and difficult, and further, due to the size and the weight of the blade, poses problems for logistics, such as transportation of the blade.

To address such problems, the document U.S. Pat. No. 7,204,674 B2 describes a rotor blade that has at its trailing edge a part that allows reduction of the chord length of the blade, for example by providing an inflatable part that is deflated during transport and can be inflated during normal operation.

Other solutions disclosed in the document include an element that can be extended to prolong a surface of the blade or deformable material that can be wound up using folding arms that extend. A problem further arises due the load applied to such large blades during high wind conditions. In the above document, the inflatable element may be deflated again to reduce the area of the blade, or the surface element may be retracted. A similar solution is disclosed in document EP 2 322 793 A1, in which a trailing edge section of the blade comprises a collapsible chamber that collapses when a predetermined rotor speed is reached. Thereby, the aerodynamic performance of the blade is reduced, whereby over-speed control is achieved. The reduced aerodynamic performance reduces the rotor speed and thus prevents damage to the blade.

Further, it is known from documents US 2014/0112780 A1 and US 2009/074574 A1 to provide a deformable airfoil that allows the changing of the airfoil shape between different airfoil types. It is further known from US 2012/0141271 A1 to modify the flow on the suction side in an outboard part of the blade by devices, in particular spoilers, which separate the flow of air from the outer surface of the blade to reduce the lift generated by the blade, thereby reducing the loads acting on the blade.

The above solutions still suffer from deficiencies regarding their aerodynamic performance. In particular, it is desirable to allow the tuning of the aerodynamic performance in accordance with the design goals of the blade designer. It may in particular be beneficial to provide a lift increase and/or drag decrease.

The document EP 2 716 906 A2 describes a tab element for being mounted on a pressure side of a blade.

The document WO 2014 064195 A1 describes a wedge element for mounting on a pressure side of a rotor blade. The wedge element has a bulge that bulges outwardly from the pressure side.

The document WO 2022/136547 A1 describes a blade element which is adapted to be mounted on a pressure side of a blade, wherein the blade element has a bulge shape that bulges outwardly from the pressure side.

SUMMARY

There is accordingly a need to mitigate at least some of the drawbacks mentioned above and to improve the aerodynamic properties of a wind turbine blade, in particular in the root region thereof.

This need is met by the features of the independent claims. The dependent claims describe embodiments of the invention.

According to an aspect of the invention, a flow modifying element for a wind turbine blade is provided, wherein the wind turbine blade comprises a blade body having a leading edge, a suction surface, a pressure surface, and a trailing edge. The blade body has a chord length c, wherein the leading edge corresponds to a position in chord direction of 0% c, and the trailing edge corresponds to a position in chord direction of 100% c. The flow modifying element is configured to be arranged on the pressure surface of the blade body in a range in chord direction between 40% c and 100% c. The flow modifying element is further configured to form a bulge that bulges outwardly from the pressure surface of the blade body.

Such flow modifying element (abbreviated herein as "element") may increase the lift of the blade, in particular for the longitudinal range over which the element is provided. Compared to known add-ons for blades, such as Dino Shells®, flow perturbation may be reduced. Furthermore, such element may be compatible with additional suction side add-ons, such as vortex generators, and trailing edge add-ons or other trailing edge solutions. The aerodynamic properties of the respective section of the blade may thus be tuned in accordance with longitudinal position and desired characteristics. The bulge may provide a shape that has an optimized aerodynamic performance and may in particular result in a lift coefficient (CL) increase. The bulge may further have smooth transitions to the pressure surface of the blade, thus reducing the increase of the drag coefficient (CD); it may thus maximize CL/CD.

Preferably, the suction surface and the pressure surface correspond to a respective profile curve of the blade body, wherein each of the respective profile curves of the suction surface and pressure surface extend from the leading edge to the trailing edge of the blade body.

In particular, in a stationary state of the wind turbine blade (i.e. in a state in which the rotor blade does not rotate), the flow modifying element has or comprises the bulge. The bulge may thus be present both when the blade rotates and when the blade does not rotate.

The bulge may extend in a longitudinal direction of the blade, in particular in the direction of the trailing edge.

It may extend substantially parallel to the trailing edge of the blade body. It may be continuous over a longitudinal range, or one or more longitudinal segments of predefined length in longitudinal direction may be provided.

The position of the element in chord direction may be determined by the position of a center (or middle) between a leading end and a trailing end in chord direction of the element, in particular the middle of a line connecting these two points in a profile of the element. This center may be arranged between 40% c and 100% c, or the whole extension of the element in chord direction may lie within this range. The range may in particular extend from a position at which the center of the element is arranged at 50% c, to a position at which the trailing end of the element is arranged at 100% c.

In an optional example, the flow modifying element may be shaped and configured to be arranged to increase the lift coefficient for an aerodynamic profile of the blade body by increasing a pressure on a leading portion of the bulge. The bulge may in particular be shaped so that during operation, air streaming past the bulge is increased in pressure on the leading portion of the bulge. The bulge may reduce the local 10 flow speed at the pressure side of the blade, producing an increased pressure coefficient, which may result in an increase of the lift coefficient. Lift may in particular be increased in the root region of the blade.

The flow modifying element may in particular be configured to increase the extraction of energy from the wind. It may thus operate differently from known spoilers or vortex generators, which introduce energy into the flow.

The flow modifying element and the blade body may form an aerodynamic profile, wherein the bulge may be shaped to provide in the aerodynamic profile a bulge profile section that approximates or is a convex curve. The profile section may include straight and (convexly) curved segments; however, a continuously curved shape is preferred. The bulge profile section may approximate a part of a Gaussian, polynomial, circular, elliptical, hyperbolic, or other type of curve shape.

The flow modifying element may comprise a first transition section that provides a continuous (in particular a smooth) transition between the pressure surface of the blade body and a leading portion of the bulge, and/or may comprise a second transition section that provides a continuous (in particular a smooth) transition between the pressure surface of the blade body and a trailing portion of the bulge. Such transition section may form part of the bulge. The element may thus provide a smooth shape at its leading and trailing sides and a smooth transition to the blade surface, which may have a positive effect on the drag coefficient. The element may in particular be configured to provide a pressure side surface that is continuous at the leading end and/or at the trailing end of the element with the pressure surface of the blade body.

As an example, the element may be configured such that an angle formed between the first and/or second transition section and the pressure surface of the blade body may be between 140° and 180°, it may in particular be an obtuse angle or tangential. Tangency with the pressure surface may thus be maintained at the leading and/or trailing end of the element. The first transition section may be shaped to provide a first concave curve section and/or the second transition section may be shaped to provide a second concave curve section. The bulge profile section may be arranged between the first concave curve section and the second curve section. For example, in the aerodynamic profile, the flow modifying element may comprise a first inflection point at which the first concave curve section transitions to the bulge profile section and/or a second inflection point at which the second concave curve section transitions to the bulge profile section. A smooth aerodynamic shape of the element may thus be provided.

The curvature of the first and second concave curve sections may be the same, similar or different.

The flow modifying element may have in the aerodynamic profile a width from a leading end to a trailing end of the flow modifying element. The width may be between 78c and 45% c, preferably between 10% c and 40% c, more preferably between 10% c and 30% c. Providing the element with these dimensions in chord direction may allow a tuning of the element to achieve the desired aerodynamic properties. The width may be defined as the distance between the leading end and the trailing end of the element in the profile (i.e. in a cross-section perpendicular to the longitudinal extension of the blade).

The flow modifying element, in particular the bulge, may have a thickness of 5% c to 30% c, preferably 10% c to 20% c. One or both of the width of the element, in particular of the bulge, and the thickness of the element, in particular of the bulge, may be adjusted, for example in dependence on the location in longitudinal direction of the blade and the twist or operational pitch at the respective location. Likewise, the curvature of the element in the profile may be tuned to the aerodynamic properties required at the respective location and operational pitch. The thickness of the element, in particular of the bulge, may correspond in the aerodynamic profile to the largest distance of the bulge perpendicular to a straight line that connects the leading end and the trailing end of the element in the profile.

The flow modifying element may be configured to be compatible with trailing edge add-on devices (it may for example not extend beyond the tailing edge of the blade body) and/or suction surface add-on devices. By the compatibility with further add-on devices for the blade, an additional CL increase may be achieved. Further, such combination may achieve lower CD values, since the drag penalties associated with a single device may be minimized by such combination of aerodynamic devices, i.e. a respective tuning of the devices may at least partially compensate the drag increase associated with a single device.

In an optional example, the flow modifying element is an active element and is configured to be adaptable in at least one of position in chord direction, thickness of the element, in particular of the bulge, and shape of the bulge. Such adaptability may in particular allow an adjustment of the element in accordance with prevailing operating conditions, such as operational pitch angle, and longitudinal position of the element on the blade. Further, the element may be adjusted dynamically in accordance with prevailing wind conditions, rotational speed of the rotor, angle of attack, and the like. The variability of thickness, chord position and/or shape, i.e. the ranges within which the respective parameter can be varied, may depend on the location in longitudinal direction of the blade and on the operational pitch of the respective blade section.

The thickness of the element, in particular of the bulge, may for example be variable between a minimum thickness value of 5% c to 10% c, and a maximum thickness value of 10% c to 30% c. The value by which the thickness may be varied, may lie between 3% c and 25% c.

The flow modifying element may comprise one, two, three or more chambers and may further comprise a flow connection towards the respective chamber to allow a changing of the pressure inside the chamber to adjust the shape and/or thickness of the bulge. A technically simple implementation of an active modification of thickness and/or shape may thus be achieved.

Exemplary implementations include a central chamber, or a leading end chamber and a trailing end chamber, or an additional central chamber between these latter two. The one or more chambers may for example be pressurized by the same pressure to adjust the height. Applying different pressures to different chambers may allow the adjustment of the curvature of the element. For example, each chamber may be provided with a flexible surface or surface portion on the pressure side. This may allow a deformation of the shape of the respective surface, for example by changing the amount of bulging outwardly or inwardly, or by a changing from bulging outwardly to bulging inwardly or vice versa. It is also conceivable to provide a portion of the pressure side surface of the element in a rigid material, e.g. a central portion, so that it does not change its shape, and to provide other flexible portions (e.g. towards the leading and trailing ends) that allow an adjustment of height and optionally a deformation of the shape in these portions.

Each chamber may have a separate flow connection for a respective medium, such as gas, e.g. air, or liquid. A pneumatic or hydraulic actuator may in particular be provided (e.g. inside the blade body) for controlling the thickness and/or shape.

The element may be provided as a longitudinal segment, and each chamber may extend through the element in longitudinal direction; it may be closed off at the ends of the segments.

The element may comprise one or more tension elements that extend between the pressure side surface of the element and a mounting section of the element that faces the blade body. Such tension elements may allow the maintaining of a basic shape of the one or more chambers; they may further allow a controlled adjustment of the thickness by applying pressure.

The tension element may for example be a wall extending in longitudinal direction of the element. The tension element may provide separation between two adjacent chambers. For example, one tension element may be provided between two chambers, and two tension elements may be provided to separate three chambers of the flow modifying element. In other conceivable implementations, the plural tension members may be provided in the form of tethers, and plural of such tethers may be provided within a chamber to maintain the shape of the chamber or to allow a controlled adjustment of the shape of the chamber. Such tension element may in particular provide a tension between the pressure side surface and the mounting section when pressure is applied to the respective chamber.

The flow modifying element may further comprise a guiding element configured to guide a movement of the flow modifying element on the blade body in a direction that allows an adjustment of a distance of the flow modifying element to the trailing edge of the blade body. Such guiding element may be configured for guidance in the chord direction of the blade body or at an angle to the chord direction, e.g. perpendicular to the trailing edge. For a longitudinal segment of the element, preferably at least two guiding elements are provided, which are spaced apart in longitudinal direction. A mechanically robust and secure guiding of the element may thus be achieved.

The guiding element may for example be or comprise a pin or stud, a carriage, a rail, or the like. A complementary guiding element may be provided on the pressure side of the blade body. For example, the guiding element may be configured to allow an adjustment of the position in chord direction of the flow modifying element from a position in which the trailing end of the element is located at 100% c to a position at which the trailing end is located at 50% c, preferably from 100% c to 40% c. By allowing such active adjustment of the position of the element in chord direction, the CL/CD ratio may be optimized for the respective operating conditions.

In an example, the flow modifying element is a separate element that comprises a mounting section configured to be mounted to the pressure surface of the blade body, or the flow modifying element and the blade body are formed integrally to form the wind turbine blade.

The mounting section may comprise a mounting surface configured to face the pressure surface of the blade body. The mounting surface may be adapted or adaptable to a shape of the pressure surface. For providing an adaptable surface, the surface may for example be made of a flexible material that can conform to the shape of the pressure surface. For example when providing the element as an active element that is movable in chord direction, such mounting surface may adapt to the shape of the pressure surface as the element is moved in chord direction. If the element is not movable, the mounting surface may likewise be flexible, which may simplify manufacturing, or the mounting surface may be rigid and pre-shaped complementarily to the pressure surface at the mounting position.

The mounting section may further comprise the above-mentioned guiding element and may be mounted by the guiding element, or the mounting surface may itself be fixedly mounted to the pressure surface of the blade body, for example in case that the element is not movable.

For example, the element may be an add-on element that is configured to be mounted to the blade body by means of an adhesive, a touch fastener (such as VELCRO®), a mechanical fastener, or other suitable fastening elements.

The element may be solid (without internal cavities), or the element may comprise one or more internal cavities that extend in a longitudinal direction of the element. When provided as a passive element, such cavities may reduce the amount of required material and may make the element lighter. When provided as an active element, such cavities may correspond to the above-mentioned chambers that are pressurizable. The element may be formed of a rigid (non-deformable) material. If the element is provided with adjustable thickness and/or shape, it is preferably at least partially formed of a flexible material. Also, the mounting surface may be formed of a flexible material, or the whole element may be formed of a flexible material.

The element may for example be formed from a plastic material, a fiber-reinforced material (e.g. glass- or carbon fiber-reinforced), a composite material, or any other suitable material. Flexible portions of the element, such as the actively deformable portions and/or the mounting surface, may be formed from a rubber material or a flexible plastic material, or any other suitable flexible material.

The element may be provided as a continuous element that extends continuously over a predetermined longitudinal range of the blade (preferably substantially parallel to the trailing edge thereof). The element may also be provided as a longitudinal segment that has a predefined length in the longitudinal direction of the blade. Plural such segments may then span the predetermined longitudinal range, i.e. they may be arranged adjacent to each other to cover this longitudinal range.

The chord length of the blade body may change over the longitudinal range. The flow modifying element may have a correspondingly varying width over its extension in longitudinal direction of the blade. In other implementations, the width of the element may be constant over the longitudinal extension of a segment of the element, or over the predetermined longitudinal range. As a reference chord length for determining the geometric parameters of the element, such as thickness and/or width, an average chord length of the blade body over the longitudinal extension of the segment, or, respectively, over the longitudinal extension of the predetermined longitudinal range, may be taken. Alternatively, a median chord length, such as in the center of the respective longitudinal extension or predetermined longitudinal range may be taken as a reference chord length. The longitudinal extension of a segment of the element may for example lie within the range of 0.5 to 4 m, e.g. between 0.75 and 2 m.

As an example, the wind turbine blade may extend in a longitudinal direction from a position at 0% L, at which the wind turbine blade is mountable to a hub of a wind turbine rotor, to a blade tip at a position of 100% L, wherein L corresponds to the blade length. The flow modifying element may be configured to be provided on the blade body within a longitudinal region between 0% L and 60% L, preferably between 0% L and 50% L, more preferably between 10% L and 50% L. For example, it may be provided within the region of 20% L to 50% L, or any sub-combinations of these disclosed regions. It should be clear that the providing of the element within such region does not mean that the element needs to cover the whole region.

For example, the flow modifying element may be configured to be provided on the blade body over a longitudinal range having a longitudinal extension of at least 10% L, preferably at least 15% L, more preferably at least 20% L. A range of such longitudinal extension may accordingly be covered by the flow modifying element, wherein this range preferably lies within the above recited longitudinal region.

For example, the flow modifying element may be provided over a transition area of the blade from a cylindrical root region to a shoulder of the blade, and from the shoulder to a mid-span region of the blade.

The blade may have a length L larger than 25 m, 30 m, or 50 m.

According to another aspect of the present invention, a wind turbine blade comprising a blade body having a leading edge, a suction surface, a pressure surface and a trailing edge is provided. The wind turbine blade further comprises a flow modifying element having any of the configurations described herein. The flow modifying element is mounted to the pressure surface of the blade body or the flow modifying element and the blade body are formed integrally to form the wind turbine blade. The flow modifying element is configured to form a bulge that bulges outwardly from the pressure surface of the blade body. By such wind turbine blade, advantages similar to the ones outlined further above may be achieved. The blade may include any of the features described herein with respect to the blade or the blade body.

The flow modifying element may be configured to provide a portion of a pressure side profile section of an aerodynamic profile formed by the blade body and the flow modifying element.

The blade body may further comprise at least one guide arranged on the blade body, which may be complementary to the guiding element on the flow modifying element. The flow modifying element may be movable in a direction towards and away from the trailing edge by means of the guide, for example by sliding in the guide.

The guide may for example be a guide rail, and the rail may be configured to provide a moving range (for example in chord direction) for the flow modifying element that is dimensioned such that the flow modifying element covers the rail in any position. For example, the length of the rail may be equal to or smaller than one half of the extension of the element in the direction of movement, e.g. in chord direction if the rail extends in chord direction.

The blade body may comprise respective ports for providing a connection to one or more chambers formed in the flow modifying element, wherein the one or more chambers may be pressurizable via the ports. The blade body may further comprise respective actuators for effecting a movement of the element in the direction of the trailing edge and/or for pressurizing, e.g. hydraulically or pneumatically, one or more chambers of the element.

The flow modifying element may be a longitudinal segment that extends in longitudinal direction of the blade, and the blade may comprise plural such segments arranged along the longitudinal direction of the blade.

According to another aspect of the invention, a wind turbine comprising a wind turbine blade having any of the configurations described herein is provided. The wind turbine may for example comprise a rotor that has three respective blades.

According to a further aspect of the invention, a method of operating a wind turbine is provided, wherein the wind turbine has any of the configurations described herein, and wherein the method may comprise operating the wind turbine to convert wind energy to electrical energy.

It is to be understood that the features mentioned above and those yet to be explained below can be used not only in the respective combinations indicated, but also in other combinations or in isolation, without leaving the scope of the present invention. In particular, the features of the different aspects and embodiments of the invention can be combined with each other unless noted to the contrary.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION

Figure 1:
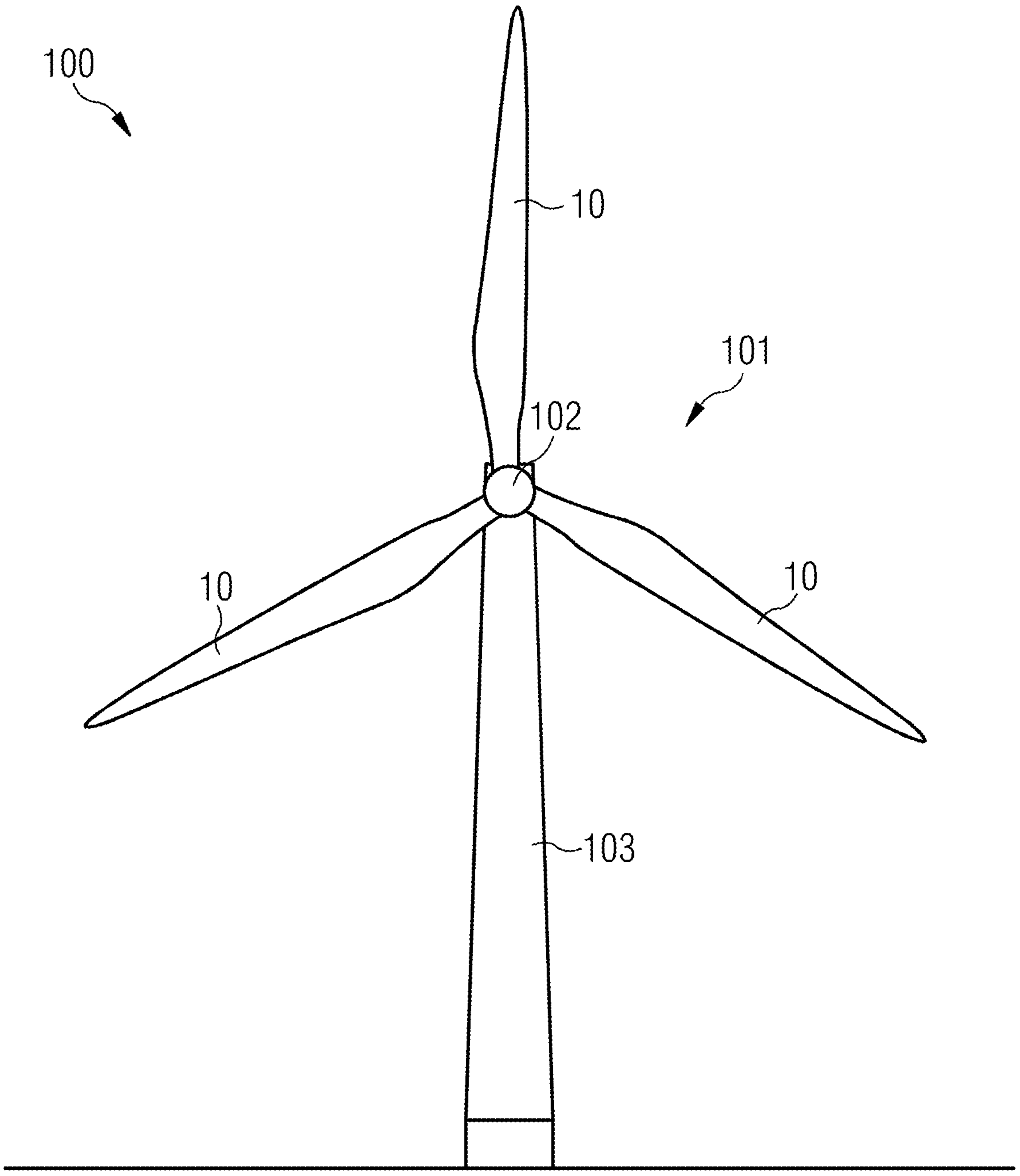
FIG. 1 is a schematic drawing showing a wind turbine including a wind turbine rotor with wind turbine blades according to an embodiment.

In the following, embodiments of the invention will be described in detail with reference to the accompanying drawings. It is to be understood that the following description of the embodiments is given only for the purpose of illustration and is not to be taken in a limiting sense.

It should be noted that the drawings are to be regarded as being schematic representations only, and elements in the drawings are not necessarily to scale with each other. Rather, the representation of the various elements is chosen such that their function and general purpose become apparent to a person skilled in the art. As used herein, the singular forms "a," "an," and "the" are intended to include the plural forms as well, unless the context clearly indicates otherwise. The terms "comprising," "having," "including," and "containing" are to be construed as open-ended terms (i.e., meaning "including, but not limited to,") unless otherwise noted.

FIG. 1 schematically illustrates a wind turbine 100 according to an example. The wind turbine 100 includes a wind turbine rotor 101 and a wind turbine tower 103. The rotor 101 has a hub 102 to which three rotor blades 10 are mounted, which may be configured in accordance with any of the examples and embodiments described herein.

Figure 2:
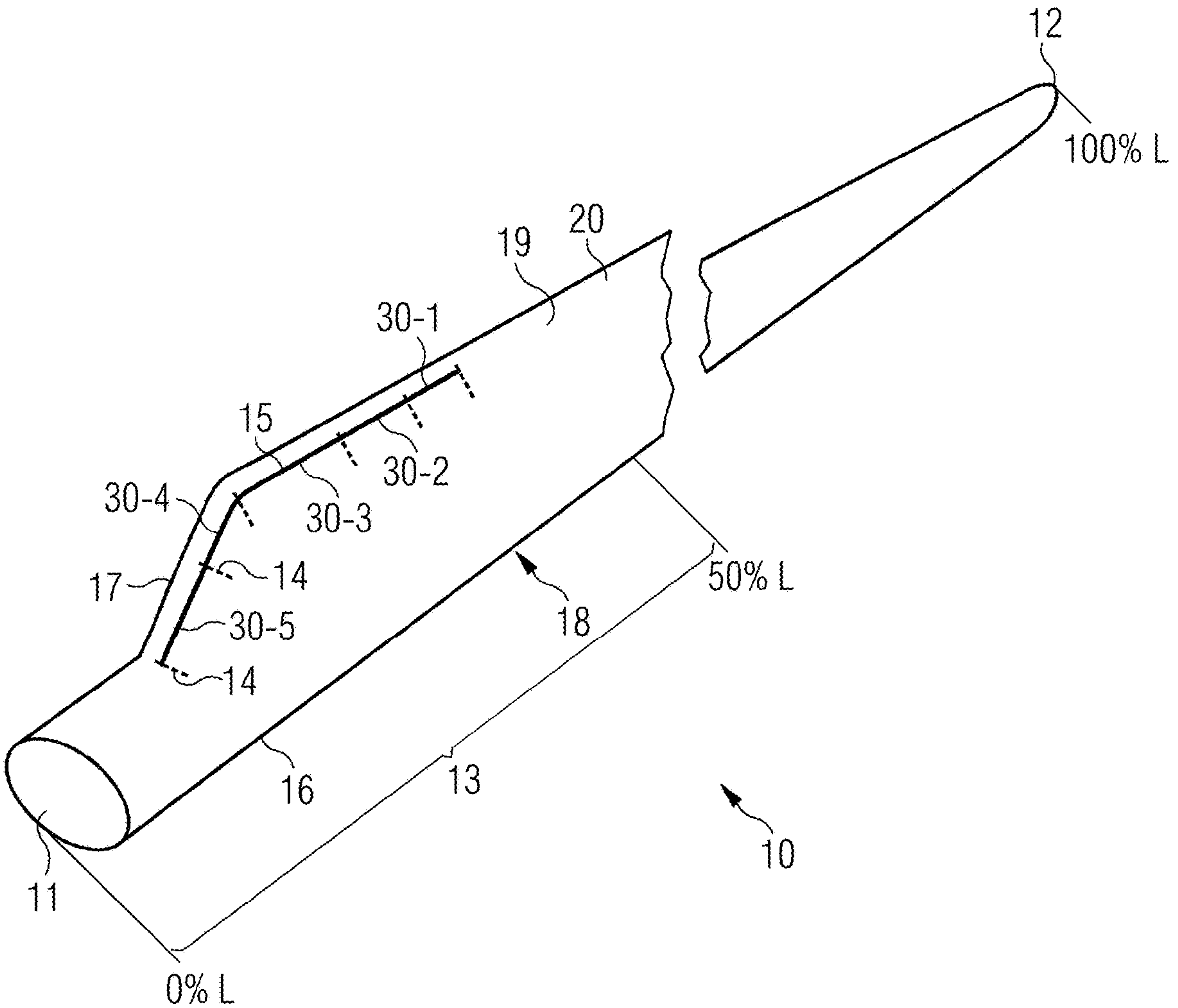
FIG. 2 is a schematic drawing showing a wind turbine blade, wherein a longitudinal range over which segments of flow modifying elements extend is indicated according to an embodiment.

FIG. 2 schematically illustrates a wind turbine blade 10 according to an embodiment. The blade has a length L, which may for example be more than 30, 50, or even more than 60 m. The blade 10 has a root end 11 at which the blade 10 is mountable to the hub 102, and has a tip end 12 at which the tip of the rotor blade is located. The root end is located at 0% L and the tip end at 100% L. A root region 30 may span from 0% L to about 50% L, although such root region may also be defined differently.

Blade 10 may include a blade body 20 and a flow modifying element 30. Blade body 20 and flow modifying element 30 may be formed integrally to form the wind turbine blade 10, or flow modifying element 30 may be an add-on element that is mounted to the blade body 20, and in particular on an exterior surface of the blade body 20. The flow modifying element may be provided within a longitudinal region, which may correspond to the root region 13, or within a longitudinal region that extends between 0% L and 60% L, preferably between 5% L and 50% L, for example between 10% L and 50% L or 10% L and 40% L.

Element 30 extends over a longitudinal range 15, i.e. it covers this range. Element 30 may be continuous over range 15, or may be provided in form of segments that are placed next to each other. In the example of FIG. 2, the flow modifying element 30 is provided in the form of respective segments 30-1, 30-2, . . . , 30-5. The dashed line 14 indicates the separation between these longitudinal segments.

Figure 3:
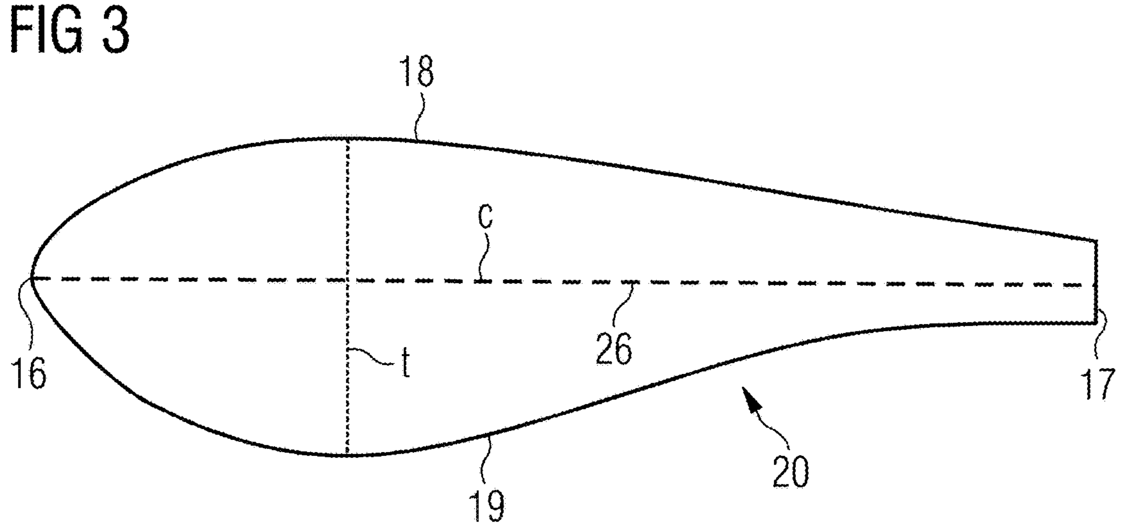
FIG. 3 is a schematic drawing showing a profile of a blade body of a wind turbine blade without flow modifying element.

Generally, a profile is a cross-section of the blade perpendicular to the longitudinal axis of the blade. Such profile, also termed "aerodynamic profile" herein, generally has a thinner airfoil shape in the outboard region of the blade, a thicker airfoil shape in the root region of the blade, and may even approximate a circular shape at the root end 11. FIG. 3 illustrates an exemplary profile of the blade body 20 which may be used in the root region 13. The chord line 26 may be defined as the line intersecting the two profile points with the largest mutual distance. Where the profile has a flat trailing edge 17, as shown in the example of FIG. 3, the chord line 26 may cut the trailing edge in the middle thereof. The chord length c is the distance between these two profile points. The thickness t of the profile may be defined as the maximum thickness perpendicular to the chord direction. The relative thickness of a profile is the ratio of thickness to chord length, t/c. Chord length and thickness may be measured without add-ons or extensions.

The profile of blade body 20 includes the leading edge 16 and the trailing edge 17. The blade body 20 further includes the suction surface 18 and the pressure surface 19 that correspond to a respective profile curve in the profile shown in FIG. 3. These profile curves extend from the leading edge 16 to the trailing edge 17 of the blade body 20. As the profile of body 20 has a flat trailing edge 17, it may be termed a flatback airfoil. The blunt trailing edge of such airfoil of the root region may also be rounded.

Figure 4:
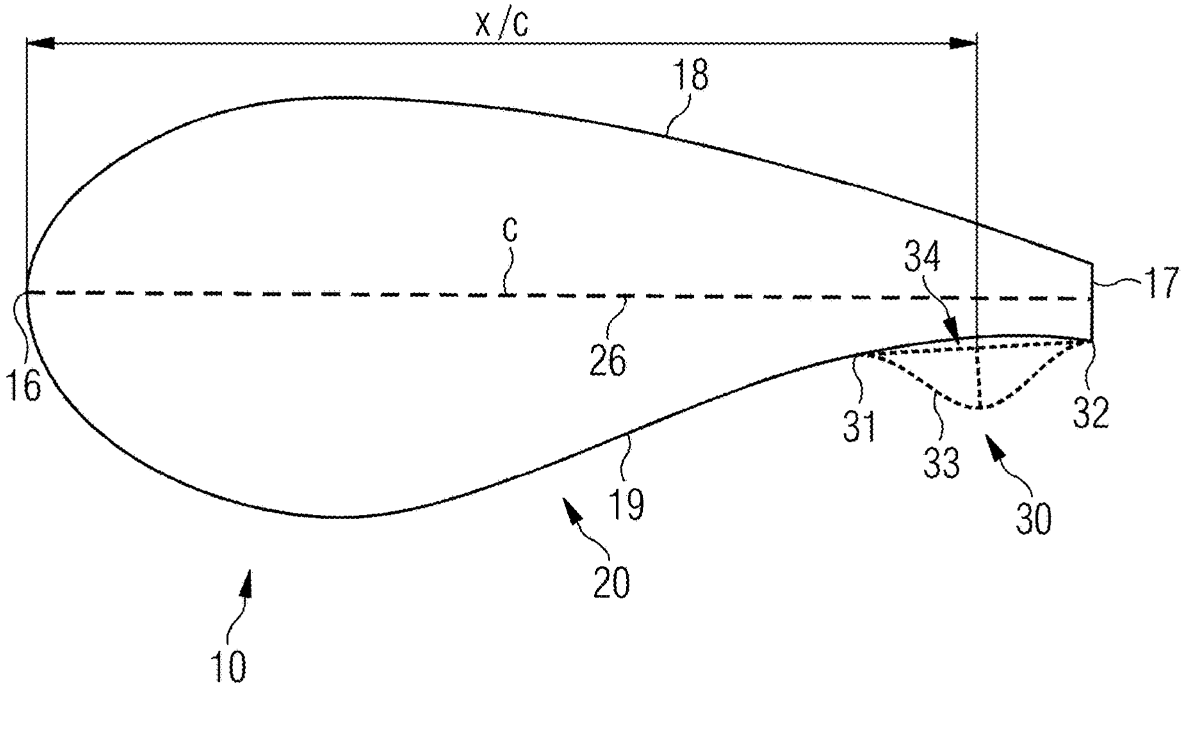
FIG. 4 is a schematic drawing showing a profile of a wind turbine blade including a flow modifying element according to an embodiment.

FIG. 4 illustrates a profile of an exemplary implementation of the blade 10 that includes the blade body 20 and the flow modifying element 30. Element 30 provides a bulge 33 that extends outwardly from the pressure surface 19. Element 30 extends between a leading end 31 (facing leading edge 16) and a trailing end 32 (facing trailing edge 17). Bulge 33 extends in a longitudinal direction along the blade (FIG. 2), e.g. substantially parallel to trailing edge 17; it may thus extend substantially perpendicular to the profile plane illustrated in FIG. 4. Element 30 includes a mounting section 34 for mounting element 30 to the pressure surface 19; this is optional, as element 30 may be integrated with the blade body 20. The position in chord direction of element 30 may be defined as the center (or middle) of the line connecting leading end 31 and trailing end 32 of element 30. FIG. 4 illustrates the relative position x/c of element 30 in chord direction, measured in terms of the chord length c. When measured from the leading edge 16 (0% c), the position of element 30 is preferably within a range of 50% c to 100% c. Although it is possible that trailing end 32 extends beyond the trailing edge 17, it is preferred that trailing end 32 does not extend beyond trailing edge 17, which may ensure compatibility with trailing edge add-on devices.

Figure 5:
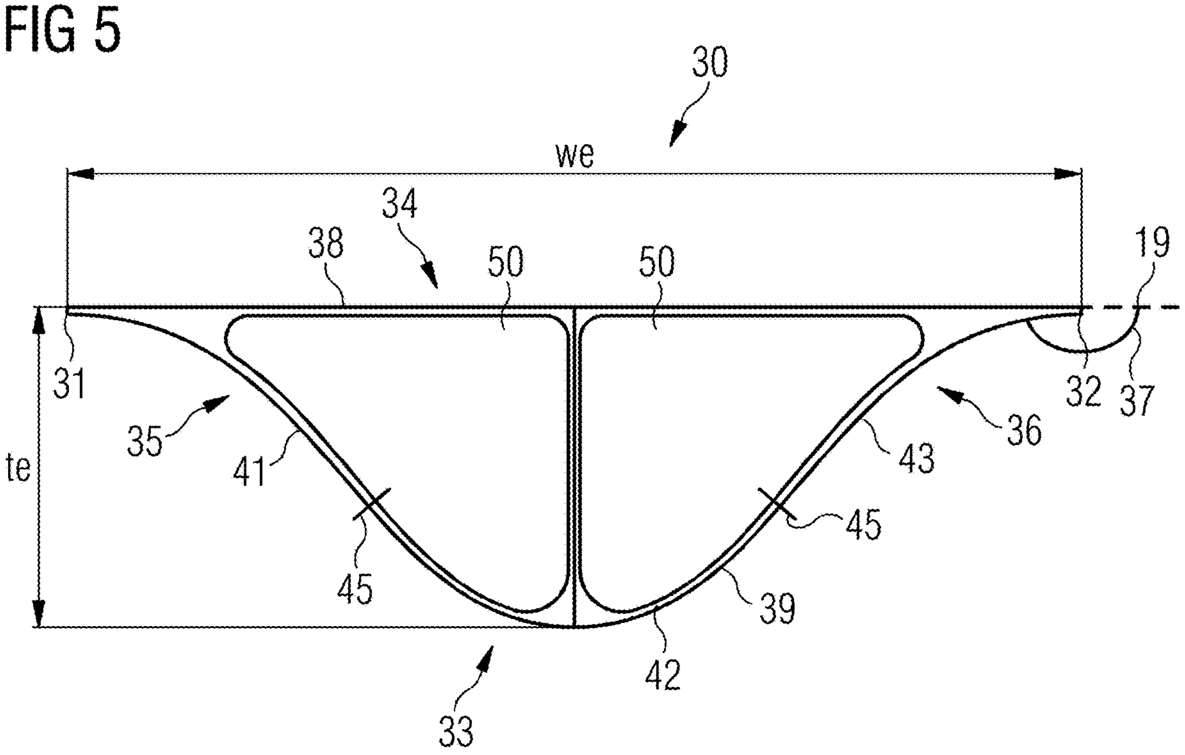
FIG. 5 is a schematic drawing showing a profile of a flow modifying element according to an embodiment.

FIG. 5 illustrates details of the profile of element 30, i.e. it shows a section through element 30 perpendicular to its longitudinal extension. A width we of element 30 may be defined as the distance between leading end 31 and trailing end 32. Width we is preferably between 10% c and 30% c. Thickness the of element 30 may be defined by the largest distance of bulge 33 from a line connecting leading end 31 and trailing end 32, in a direction perpendicular to this line. The thickness may preferably be between 5% c and 30% c, for example between 8% c and 25% c.

Element 30 may comprise a first transition section 35 and a second transition section 36, which may be considered to form part of bulge 33. These transition sections may provide a smooth transition between a pressure side surface 39 of element 30 and the pressure surface 19 of the blade body 20. In particular, the transition sections may be configured such that an angle at which the pressure side surface 39 meets the pressure surface 19 is an obtuse angle 37 that is smaller than 180° and larger than 90°, preferably larger than 130°. Such smooth transition may reduce drag.

Figure 6:
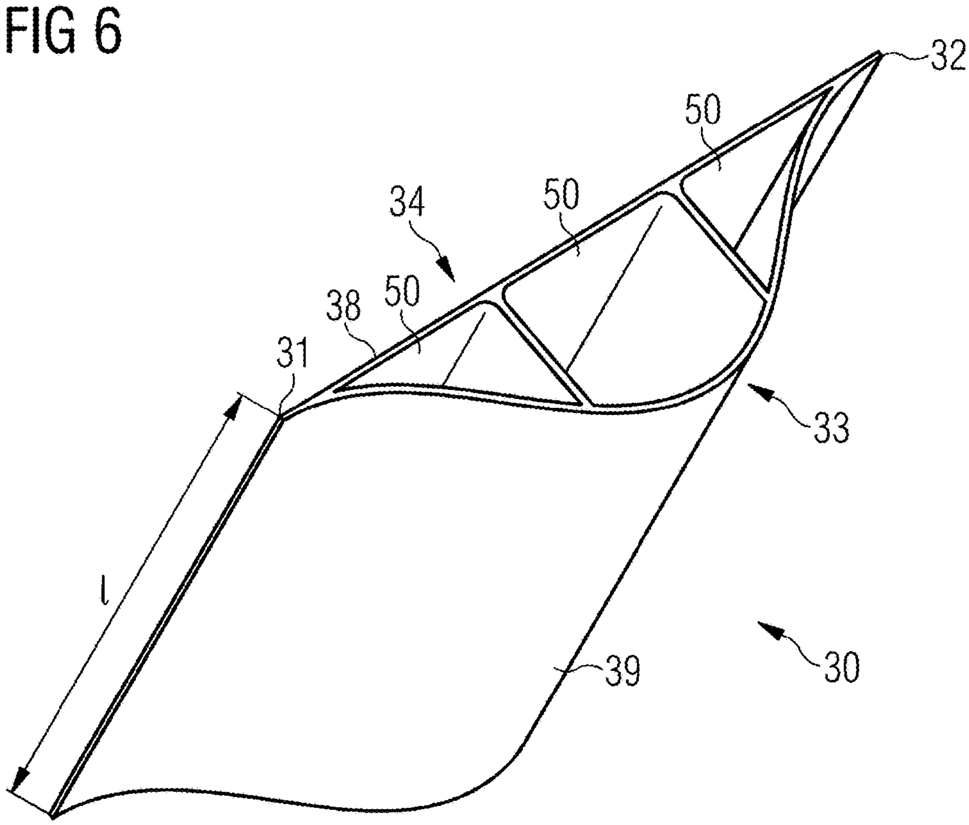
FIG. 6 is a schematic drawing showing a perspective view of a flow modifying element according to an embodiment.

In the profile, the bulge 33 may include a bulge profile section 42, which approximates a convex curve (meaning that the corresponding surface is a convex surface that bulges outwardly; see FIG. 6). Although shown as a continuous convex curve in FIG. 5, bulge profile section 42 may be composed of a mixture of straight and differently (convexly) curved sections. The first transition section 35 at the leading portion of the bulge corresponds to a concave curve section 41, and the second transition section 36 corresponds to a second concave curves section 43. Respective inflection points 45 are provided between the convex curve section 42 and the concave curve sections 41, 43. In the profile, the pressure side surface 39 of element 30 may thus approximate a Gaussian curve, a section of a sinusoidal curve, or a higher order polynomial curve. Additional drag caused by element 30 may thus be kept small. It should be clear that transition sections 35, 36 are optional, and that they may have a different shape, such as a straight shape to meet pressure surface 19 an obtuse angle 37. Further, for tuning the aerodynamic properties of element 30, the curvature of the first transition section 41 and the second transition section 43 may be different (or not present, if a straight section is used). Further, the curvature of section 42 may be asymmetric with respect to the leading and trailing sides.

Mounting section 34 may include a mounting surface 38. Mounting surface 38 may be rigid and may have a shape adapted to the shape of pressure surface 19 at the mounting position. Mounting surface 38 may alternatively be flexible to allow surface 38 to adapt to the shape of the pressure surface 19. This is particularly beneficial if element 30 is to be mounted at different positions in chord direction, or if element 30 is movable in chord direction; surface 38 may thus always adapt to the required shape. Flexibility of the mounting surface 38 may furthermore ensure that angle 37 can be close to 180° (tangencies). It may be made of a rubber material or other polymeric flexible material. Surface 38 may be mounted to pressure surface 19 by means of an adhesive, VELCRO®, mechanical fasteners including screws, brackets or the like or other conceivable mounting methods.

Element 30 may comprise cavities 50 that extend in longitudinal direction through the element. Cavities 50 may reduce the weight and the material required for manufacturing element 30. FIG. 6 illustrates a perspective view of element 30, from which these cavities and the shape of the element can be inferred. One, two, three or more cavities may be provided, and their size may be adapted in accordance with the desired mechanical strength of element 30. Element 30 may also be solid and not comprise any cavities. As illustrated in FIG. 6, the width we of element 30 may be kept constant over the longitudinal extension 1 of element 30. The shape of element 30 may thus not change in longitudinal direction. FIG. 6 shows a segment of element 30 having a defined length 1, wherein 1 may be chosen in dependence on the longitudinal position along the blade where the segment is to be mounted, and in dependence on the longitudinal extension L of the blade. Length 1 may for example be between 0.5 and 4 m, wherein FIG. 6 shows a shorter segment for the purpose of illustration. Different segments may be provided with different dimensions we, the and with a different shape of bulge 33, which allows the tuning of the aerodynamic properties of element 30 in accordance with the longitudinal position along the blade where the segment is to be mounted, and in accordance with the twist angle and angle of attack prevailing at such position.

Figure 7:
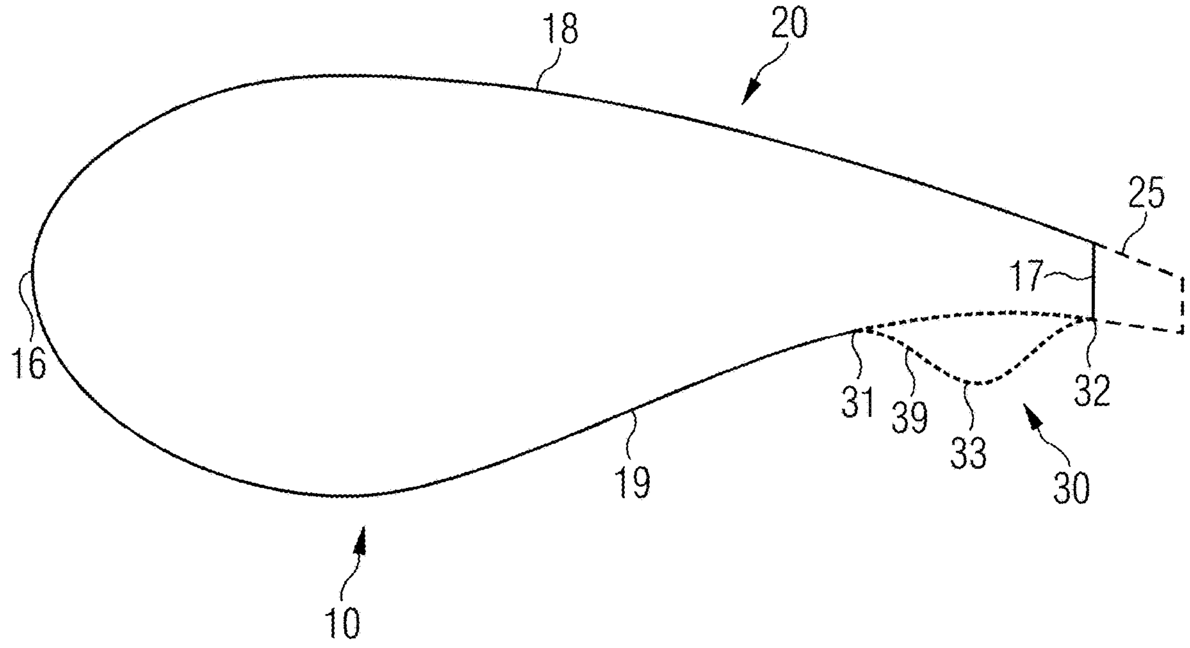
FIG. 7 is a schematic drawing showing a profile of a wind turbine blade including a trailing edge add-on and a flow modifying element according to an embodiment.

FIG. 7 illustrates an element 30 according to a further example, which is a modification of element 30 of FIGS. 4 to 6. In the example, the element 30 is not provided with a mounting section 34, but is integrated with the blade body 20. Leading and trailing ends 31, 32 are identified by the transition of the pressure side surface 39 to the pressure surface 19. Further, in the example of FIG. 7, blade 10 includes a trailing edge add-on device 25. Device 25 may be configured for providing an extension of the suction surface 18 and/or of the pressure surface 19, and may be configured for providing a lift increase and/or drag decrease. As can be seen, element 30 is compatible with respective add-on devices 25. The compatibility with suction side add-on devices is likewise ensured.

Element 30 of FIGS. 4 to 7 is a passive device, but may also be implemented as an active device. For example, one or a combination of the thickness te, the position in chord direction, or the shape of bulge 33 may be adjustable during operation.

Figure 8:
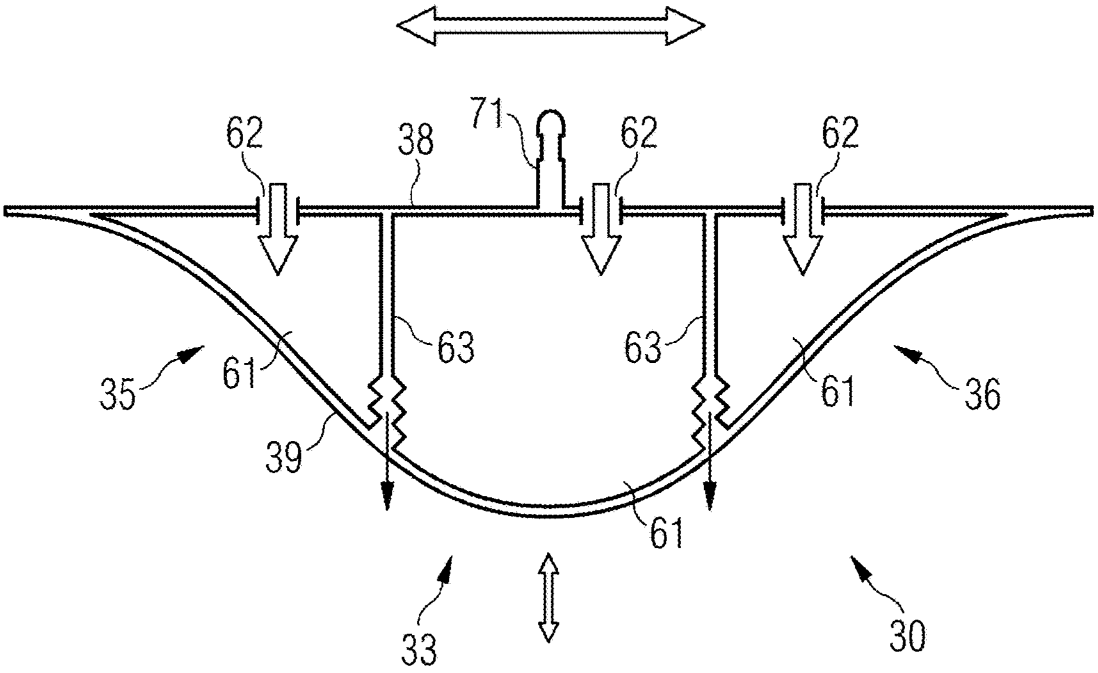
FIG. 8 is a schematic drawing showing a profile of a flow modifying element according to a further embodiment.

FIG. 8 illustrates an example, in which one, two, three or more chambers 61 are provided inside element 30, the chambers being sealed off at the longitudinal ends of element 30. A port 62 is provided through which a medium can enter and leave chamber 61. The pressure inside chamber 61 may thus be changed, so that a force can be generated that pushes the respective section of pressure surface 39 outwardly or draws it inwardly. The shape of the pressure side surface 39 that borders the respective chamber 61 may thus be adjusted by controlling pressure inside the respective chamber 61. For example, the curvature may be increased by applying a higher pressure to the central chamber or may be decreased by reducing the pressure in the central chamber. To make all chambers controllable, each chamber may be provided with a respective flow connection 62, in particular a port. Two or more chambers may be fed via the same flow connection 62 to control the pressure in these chambers together. By pressurizing all chambers with the same pressure, the thickness the of element 30 may be increased, and by reducing the pressure in each chamber, the thickness the may be reduced. This is schematically illustrated in FIGS. 9 and 10.

Figure 9:
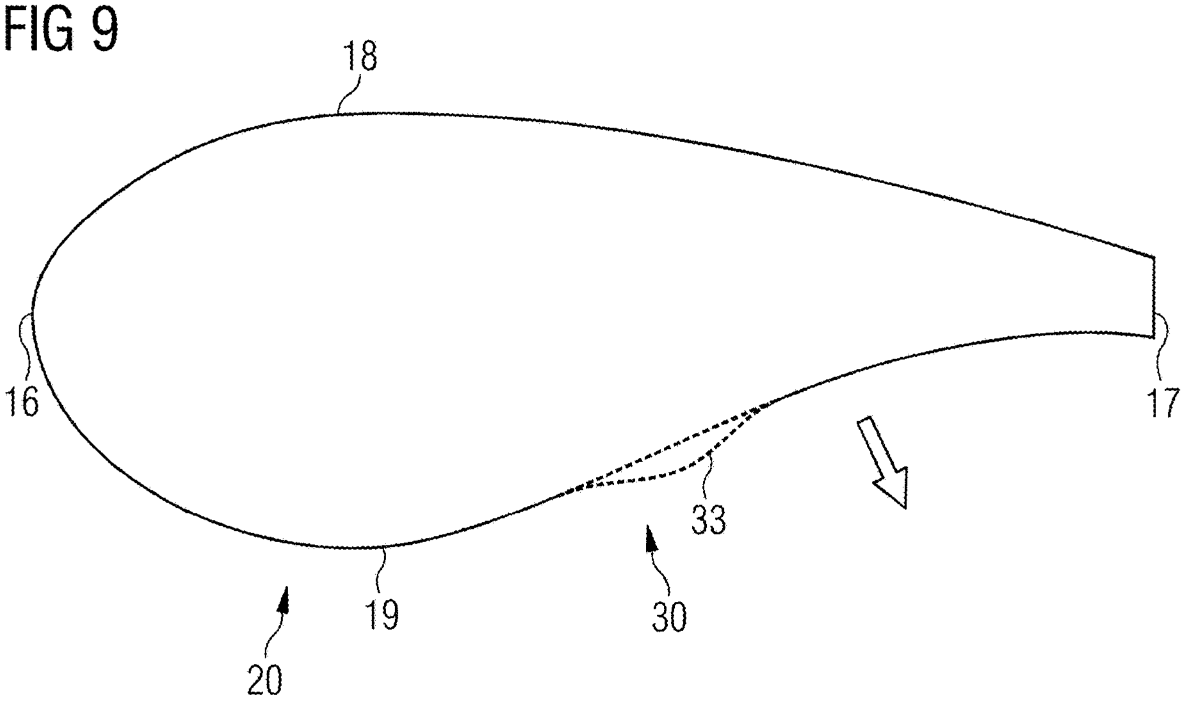
FIGS. 9 and 10 are schematic drawings showing a profile of a wind turbine blade including a flow modifying element for two different adjusted thickness values of the flow modifying element according to an embodiment.
Figure 10:
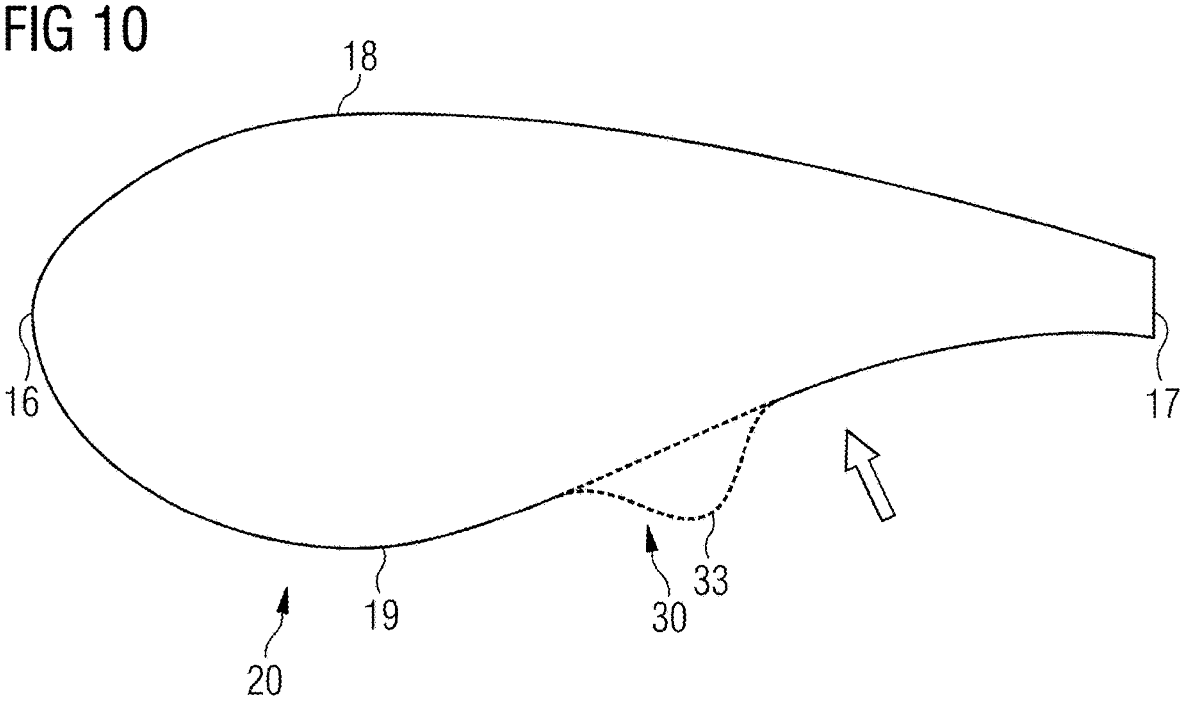

As can be seen, in FIG. 9, the pressure in the one or more chambers 61 is reduced, resulting in a quite low thickness te. In FIG. 10, a maximum pressure is applied to the one or more chambers resulting in a maximum thickness te. By applying pressures between the minimum and maximum pressures, the thickness of element 30 may be adjusted to any of the thicknesses within the minimum and maximum illustrated in FIGS. 9 and 10. The minimum value of FIG. 9 may for example be a thickness the between 5% c and 10% c, and the maximum value in FIG. 10 may be a thickness the between 10% c and 30% c. The thickness may be variable by a value of at least 5% c and up to a value of 25% c.

Element 30 may comprise one or more tension elements 63, which provide a tension between the mounting surface 38 and the pressure side surface 39 to keep the shape of element 30.

If plural chambers are provided, the tension element 63 may extend in longitudinal direction of element 30 and may provide a separating wall between two adjacent chambers. It may seal adjacent chambers from each other (if a flow connection 62 is provided to each chamber), or may provide a flow connection between chambers. If only a single chamber 61 is provided in element 30, tension elements 63 may for example be tethers that connect surfaces 38 and 39. Tension elements 63 may have a flexibility in thickness direction so that their extension in thickness direction can change in accordance with the force applied to elements 63 due to the pressure in the chambers. Elements 63 may thus maintain the shape of bulge 33 while allowing an adjustment of the thickness thereof.

By providing three chambers 61, as illustrated in FIG. 8, the curvature on the leading side and on the trailing side of element 30 may be adapted. Further, it is possible to adapt the thickness of the whole element 30. The providing of one, two, or four chambers is likewise conceivable. In blade body 20, respective ports and flow conduits may be provided and may be connected to the flow connections 62. The medium may be hydraulic or pneumatic medium, and a pressure reservoir may be provided in the blade body and may be fed from a nacelle of the wind turbine, or hydraulic/pneumatic actuators may be provided in blade body 20. Controllable valves may further be provided in the blade body 20 to control a flow from such reservoir or pressure source to chamber 61 and/or control a flow from chamber 61 to a drainage port.

To allow movement in a direction towards and away from the trailing edge 17 of the blade body, for example in chord direction, the element 30 may comprise a guiding element 71.

Guiding element 71 may interact with a complementary guiding element 75 provided in the blade body (FIG. 11) to provide movement of element 30 in the desired direction. In such configuration, the mounting surface 38 may not be fixedly mounted to pressure surface 19, but may be slidable on the pressure surface 19 to allow movement. Mounting surface 38 may be flexible to allow that its shape adapts to the shape of pressure surface 19 during the movement. Element 30 may thus be movably attached to blade body 20 by means of guiding element 71, or other attachment means that allow a respective movement.

Figure 11:
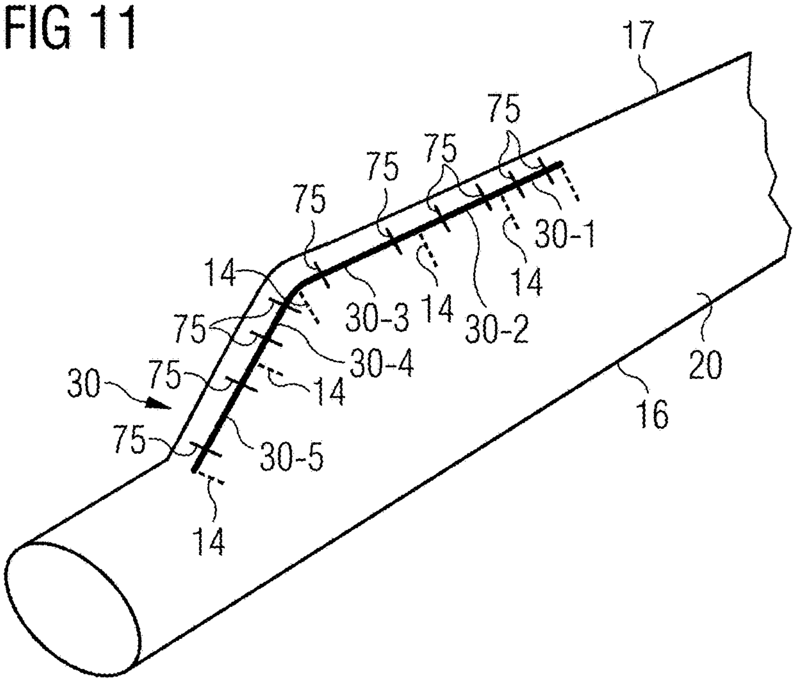
FIG. 11 is a schematic drawing showing a wind turbine blade that includes guides and segments of flow modifying elements according to an embodiment.

FIG. 11 illustrates complementary guiding elements 75 that are provided in the form of rails within which the guiding element 71, which can be a pin, carriage, or the like, can move. The complementary guiding elements 75, in particular the rails, preferably extend substantially perpendicular to the trailing edge 17 of the blade body 20 so that the distance to trailing edge 17 of element 30 is adjustable. As illustrated in FIG. 11, one or more, preferably two guiding elements 75 may be provided for each segment 30-1, . . . , 30-5 of the element 30. Each segment may thus be movable independently. A corresponding number of guiding elements 71 may be provided on each segment of element 30. As can be seen, the segments may be movable in different directions.

Figure 12:
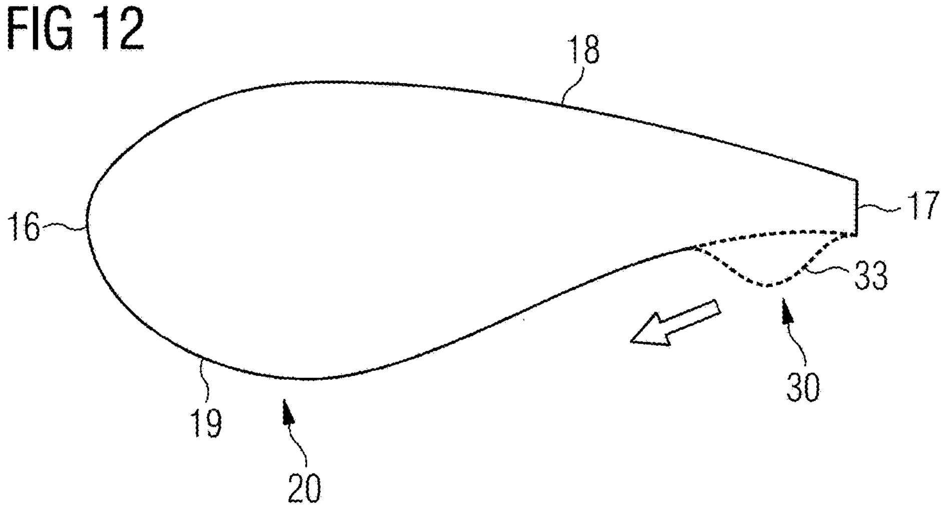
FIGS. 12 and 13 are schematic drawings showing a profile of a wind turbine blade including a flow modifying element for two different adjusted positions in chord direction of the flow modifying element according to an embodiment.
Figure 13:
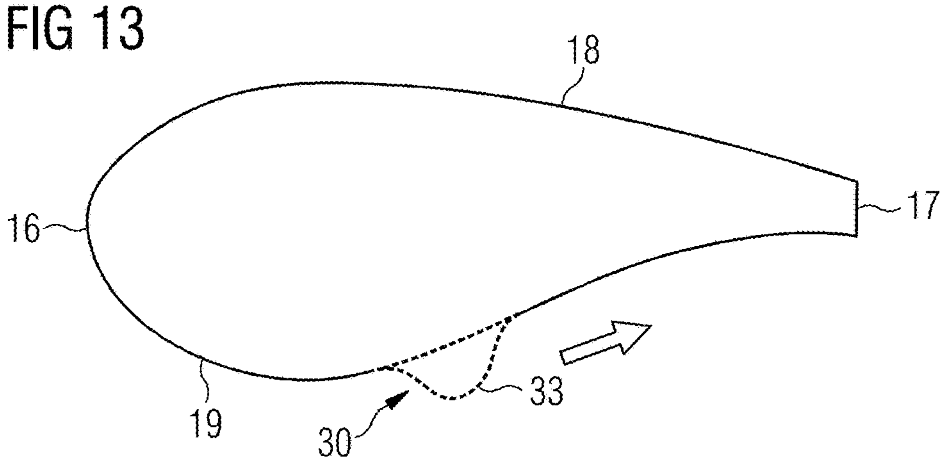

As an example, FIG. 12 illustrates a profile with the element 30 at a maximum chord position the arrow indicating the adjustability. FIG. 13 illustrates the element 30 at a minimum chord position in the same profile, the arrow indicating the adjustability of the position. It should be clear that element 30 may be controlled to take any of the positions between the maximum and the minimum positions illustrated in FIGS. 12, 13. The maximum position may for example be at 100% c, and the minimum position may be at 50% c, and the position may be adjustable to take any of the positions there-between. The extension of the guiding elements 75, e.g. the rails, is however preferably limited to a size so that the rails are covered by the element 30 in any of the positions. The maximum length of the rails may for example correspond to one half of the width we of the element 30, so that at the maximum and minimum positions, the rail is covered by element 30. It should be clear that the length of the guiding elements 75 limit the movement in the respective direction.

Movement of element 30 as guided by guiding elements 71, 75, may be effected by an electrical actuator, a hydraulic actuator, a pneumatic/hydraulic actuator or other conceivable actuation devices. An electrical motor or hydraulic or pneumatic compressor may be installed in the blade body 20, or in a nacelle of the wind turbine. In the latter case, respective transmission elements, such as a rotating shaft, or hydraulic or pneumatic lines, may then extend through the blade to the site of the element 30. As an example, a pneumatic or hydraulic piston may be used to move guide 71 in rail 75 back and forth in a controllable way, or a rack and pinion arrangement may be provided to translate a rotational motion of an electric motor to a linear movement that moves guiding element 71 in the rail 75.

Although the present example uses a pin on element 30 and a rail on the blade body 20 as guiding elements, it should be clear that other configurations are conceivable and that the arrangement may be reversed, for example by providing a rail along the width direction of element 30 and by providing one or more respective pins or studs on the blade body 20 that move in such rail.

Both actuation mechanisms may certainly be combined. For example, the flow connections 62 may be connected by flexible hoses that are provided in recesses or slits on the surface of blade body 20 so that a flow connection to chambers 61 can be established while allowing movement of element 30 in chord direction. Although the flow connection 62 and the guiding element 71 are shown in the same plane in FIG. 8, it should be clear that they can be distributed along the longitudinal extension of element 30, so that they do not interfere with each other when element 30 is moved.

Respective electrical/pneumatic/hydraulic actuators and/or control valves may be controlled by a wind turbine controller of wind turbine 100. Such controller may be arranged in a nacelle of the wind turbine and may comprise a respective processor and memory (not shown) for processing control instructions and for giving out respective electrical control signals. According to the operating point of the wind turbine and/or environmental conditions, such as wind speed, the parameters of such active element 30 may be adjusted to achieve the desired aerodynamic properties of the blade. Such adjustment may depend on the longitudinal position along the blade at which the respective segment 30-1, . . . , 30-5 is mounted. In particular, the chord position of the element and the thickness of the element may be adjusted to optimize the CL/CD ratio for the prevailing operating conditions.

By means of the flow modifying element 30, improved aerodynamic properties of the blade may thus be achieved for both the passive version and for the active version of the element. The element 30 allows the extracting of more energy from the airflow, in particular by increasing the lift of the blade. The smooth shape of the flow modifying element furthermore minimizes the additional drag.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A flow modifying element for a wind turbine blade, wherein the wind turbine blade (10) comprises a blade body (20) having a leading edge (16), a suction surface (18), a pressure surface (19), and a trailing edge (17), wherein the blade body (20) has a chord length c, wherein the leading edge (16) corresponds to a position in chord direction of 0% c and the trailing edge (17) corresponds to a position in chord direction of 100% c, wherein the flow modifying element (30) is configured to be arranged on the pressure surface (19) of the blade body (20) in a range in chord direction between 40% c and 100% c, and wherein the flow modifying element (30) has a bulge (33) that bulges outwardly from the pressure surface (19) of the blade body (20), wherein the flow modifying element (30) is shaped and configured to be arranged to increase the lift coefficient of an aerodynamic profile of the blade body (20) by increasing a pressure of air streaming past the bulge (33) on a leading portion of the bulge (33), and wherein the flow modifying element (30) is an active element and is configured to be adaptable in at least one of: position in chord direction, thickness (te) of the bulge (33), and shape of the bulge (33), and wherein the flow modifying element (30) further comprises a guiding element (71) configured to guide a movement of the flow modifying element (30) on the blade body (20) in a direction that allows adjustment of a distance of the flow modifying element (30) to the trailing edge (17) of the blade body (20).

2. The flow modifying element according to claim 1, wherein the flow modifying element (30) and the blade body (20) form an aerodynamic profile, wherein in the bulge (33) is shaped to provide in the aerodynamic profile a bulge profile section (42) that approximates or is a convex curve.

3. The flow modifying element according to claim 2, wherein the flow modifying element (30) comprises a first transition section (35) that is configured to provide a continuous transition between the pressure surface (19) of the blade body (20) and a leading portion of the bulge (33), and/or comprises a second transition section (36) that is configured to provide a continuous transition between the pressure surface (19) of the blade body (20) and a trailing portion of the bulge (33).

4. The flow modifying element according to claim 3, wherein in the profile, the first transition section (35) is shaped to provide a first concave curve section (41), and/or the second transition section (36) is shaped to provide a second concave curve section (43), the bulge profile section (42) being arranged between the first concave curve section (41) and the second concave curve section (43).

5. The flow modifying element according to claim 2, wherein the flow modifying element (30) has in the profile a width from a leading end (31) to a trailing end (32) of the flow modifying element (30), wherein the width (we) is between 7% c and 45% c.

6. The flow modifying element according to claim 1, wherein the flow modifying element (30), in particular the bulge (33), has a thickness (te) of 5% c to 30% c.

7. The flow modifying element according to claim 1, wherein the flow modifying element (30) comprises one, two, three or more chambers (61) and further comprises a flow connection (62) towards the respective chamber (61) to allow a changing of the pressure inside the chamber (61) to adjust the shape and/or thickness of the bulge (33).

8. The flow modifying element according to claim 1, wherein the flow modifying element (30) is a separate element that comprises a mounting section (34) configured to be mounted to the pressure surface (19) of the blade body (20), or wherein the flow modifying element (30) and the blade body (20) are formed integrally to form the wind turbine blade (10).

9. The flow modifying element according to claim 8, wherein the mounting section (34) comprises a mounting surface (38) configured to face the pressure surface (19) of the blade body (20), wherein the mounting surface (38) is adapted or adaptable to a shape of the pressure surface (19).

10. The flow modifying element according to claim 1, wherein the wind turbine blade (10) extends in a longitudinal direction from a position at 0% L, at which the wind turbine blade is mountable to a hub of a wind turbine rotor, to a blade tip at a position of 100% L, wherein L corresponds to a length of the blade (10), wherein the flow modifying element (30) is configured to be provided on the blade body (20) within a longitudinal region between 0% L and 60% L.

11. The flow modifying element according to claim 1, wherein the flow modifying element (30) is configured to be provided on the blade body (20) over a longitudinal range (15) having a longitudinal extension of at least 10% L wherein L corresponds to a length of the blade (10).

12. The flow modifying element according to claim 1, wherein the flow modifying element (30) is configured to be mounted to the pressure surface of the blade body and/or wherein the flow modifying element (30) does not comprise or form the trailing edge (17) of the blade body (20).

13. A wind turbine blade comprising a blade body (20) having a leading edge (16), a suction surface (18), a pressure surface (19), and a trailing edge (17), wherein the wind turbine blade (10) further comprises:

a flow modifying element (30) according to claim 1, wherein the flow modifying element (30) is mounted to the pressure surface (19) of the blade body (20) or wherein the flow modifying element (30) and the blade body (20) are formed integrally to form the wind turbine blade (10).

* * * * *